United States Patent
Nachenberg et al.

(10) Patent No.: US 8,650,647 B1
(45) Date of Patent: *Feb. 11, 2014

(54) WEB SITE COMPUTER SECURITY USING CLIENT HYGIENE SCORES

(75) Inventors: Carey S. Nachenberg, Northridge, CA (US); Michael P. Spertus, Wilmette, IL (US)

(73) Assignee: Symantec Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,401

(22) Filed: Jul. 24, 2012

Related U.S. Application Data

(63) Continuation of application No. 11/692,469, filed on Mar. 28, 2007, now Pat. No. 8,250,657, which is a continuation-in-part of application No. 11/618,215, filed on Dec. 29, 2006, now Pat. No. 8,312,536.

(51) Int. Cl.
  *G06F 11/30* (2006.01)
  *G06F 15/00* (2006.01)
  *G06N 5/00* (2006.01)

(52) U.S. Cl.
  USPC .......... 726/23; 726/1; 726/6; 726/22; 726/24; 726/25; 726/27; 713/150; 713/151; 713/165; 713/168; 713/187; 713/188; 713/200; 713/201; 709/207; 709/217; 709/225; 707/737; 707/752; 707/781; 715/738; 706/12; 706/10; 706/45

(58) Field of Classification Search
  USPC ......................................................... 726/23
  See application file for complete search history.

(56) References Cited

U.S. PATENT DOCUMENTS

| | | |
|---|---|---|
| 7,197,539 B1 | 3/2007 | Cooley |
| 7,412,516 B1 | 8/2008 | Brown et al. |
| 7,472,420 B1 | 12/2008 | Pavlyushchik |
| 7,546,349 B1 | 6/2009 | Cooley |
| 7,562,304 B2 | 7/2009 | Dixon et al. |
| 7,587,367 B2 | 9/2009 | Mengerink |
| 7,668,951 B2 | 2/2010 | Lund et al. |
| 7,783,741 B2 | 8/2010 | Hardt |
| 7,870,608 B2 | 1/2011 | Shraim et al. |
| 8,001,606 B1 | 8/2011 | Spertus |

(Continued)

OTHER PUBLICATIONS

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index. html>.

(Continued)

*Primary Examiner* — Nathan Flynn
*Assistant Examiner* — Bryan Wright
(74) *Attorney, Agent, or Firm* — Fenwick & West LLP

(57) ABSTRACT

A reputation server is coupled to multiple clients via a network. Each client has a security module that detects malware at the client. The security module computes a hygiene score based on detected malware. The security module provides the hygiene score and an identifier of a visited web site to a reputation server. The security module also provides identifiers of files encountered at specified web sites to the reputation server. The reputation server computes secondary hygiene scores for web sites based on the hygiene scores of the clients that visit the web sites. The reputation server further computes reputation scores for files based on the secondary hygiene scores of sites that host the files. The reputation server provides the reputation scores to the clients. A reputation score represents an assessment of whether the associated file is malicious.

20 Claims, 5 Drawing Sheets

(56) References Cited

U.S. PATENT DOCUMENTS

| | | |
|---|---|---|
| 8,019,689 B1 | 9/2011 | Nachenberg |
| 8,200,587 B2 | 6/2012 | Deyo |
| 8,250,657 B1* | 8/2012 | Nachenberg et al. ........... 726/25 |
| 8,312,536 B2 | 11/2012 | Nachenberg et al. |
| 8,341,745 B1 | 12/2012 | Chau et al. |
| 2002/0046041 A1 | 4/2002 | Lang |
| 2003/0167308 A1 | 9/2003 | Schran |
| 2004/0054661 A1 | 3/2004 | Cheung |
| 2005/0050335 A1 | 3/2005 | Liang et al. |
| 2005/0268090 A1 | 12/2005 | Saw et al. |
| 2005/0283837 A1 | 12/2005 | Olivier et al. |
| 2006/0026123 A1 | 2/2006 | Moore et al. |
| 2006/0085328 A1 | 4/2006 | Cohen et al. |
| 2006/0212270 A1 | 9/2006 | Shiu et al. |
| 2006/0212925 A1* | 9/2006 | Shull et al. ................... 726/1 |
| 2006/0212930 A1 | 9/2006 | Shull et al. |
| 2006/0212931 A1 | 9/2006 | Shull et al. |
| 2006/0230039 A1 | 10/2006 | Shull et al. |
| 2006/0253458 A1 | 11/2006 | Dixon et al. |
| 2006/0253581 A1 | 11/2006 | Dixon et al. |
| 2006/0253583 A1 | 11/2006 | Dixon et al. |
| 2006/0253584 A1 | 11/2006 | Dixon et al. |
| 2007/0011739 A1 | 1/2007 | Zamir et al. |
| 2007/0016953 A1 | 1/2007 | Morris et al. |
| 2007/0050444 A1 | 3/2007 | Costea et al. |
| 2007/0067843 A1 | 3/2007 | Williamson et al. |
| 2007/0094734 A1 | 4/2007 | Mangione-Smith et al. |
| 2007/0107053 A1 | 5/2007 | Shraim et al. |
| 2007/0124579 A1 | 5/2007 | Haller |
| 2007/0143629 A1 | 6/2007 | Hardjono et al. |
| 2007/0156886 A1 | 7/2007 | Srivastava |
| 2007/0162349 A1 | 7/2007 | Silver |
| 2007/0192855 A1 | 8/2007 | Hulten et al. |
| 2007/0233782 A1 | 10/2007 | Tali |
| 2008/0005223 A1 | 1/2008 | Flake et al. |
| 2008/0028463 A1 | 1/2008 | Dagon et al. |
| 2008/0077994 A1 | 3/2008 | Comlekoglu |
| 2008/0082628 A1 | 4/2008 | Rowstron et al. |
| 2008/0082662 A1* | 4/2008 | Dandliker et al. ............ 709/225 |
| 2008/0104180 A1 | 5/2008 | Gabe |
| 2008/0109244 A1 | 5/2008 | Gupta |
| 2008/0109473 A1 | 5/2008 | Dixon et al. |
| 2008/0109491 A1 | 5/2008 | Gupta |
| 2008/0114709 A1 | 5/2008 | Dixon et al. |
| 2008/0133540 A1 | 6/2008 | Hubbard et al. |
| 2008/0133972 A1 | 6/2008 | Verbowski et al. |
| 2008/0137864 A1 | 6/2008 | Jin et al. |
| 2008/0140442 A1 | 6/2008 | Warner |
| 2008/0140820 A1 | 6/2008 | Snyder et al. |
| 2008/0141366 A1 | 6/2008 | Cross et al. |
| 2008/0189788 A1 | 8/2008 | Bahl |
| 2008/0255977 A1 | 10/2008 | Altberg et al. |
| 2008/0263677 A1 | 10/2008 | Kaditz et al. |
| 2009/0125382 A1 | 5/2009 | Delepet |
| 2009/0254993 A1 | 10/2009 | Leone |
| 2009/0282476 A1 | 11/2009 | Nachenberg et al. |
| 2009/0328209 A1 | 12/2009 | Nachenberg |
| 2010/0005291 A1 | 1/2010 | Hulten et al. |
| 2010/0153354 A1 | 6/2010 | Buccella et al. |
| 2011/0040825 A1 | 2/2011 | Ramzan et al. |
| 2011/0055923 A1 | 3/2011 | Thomas |
| 2011/0067101 A1 | 3/2011 | Seshadri et al. |
| 2011/0225655 A1 | 9/2011 | Niemel et al. |
| 2012/0278264 A1 | 11/2012 | Deyo |

OTHER PUBLICATIONS

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," $4^{th}$ Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "Snare: A Link Analytic System for Graph Labeling and Risk Detection," Proceedings of the $15^{th}$ ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the $16^{th}$ International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the $46^{th}$ Annual Southeast Regional Conference on XX, ACM, 2008, pp. 509-510, New York, N.Y.

Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malwarejsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=2009070 6_02>.

Tesauro, G. et al., "Neural Networks for Computer Virus Recognition," IEEE Expert, 1996, pp. 5-6, vol. 11, No. 4.

(56) References Cited

OTHER PUBLICATIONS

Tong, H. et al., "Fast Best-Effort Pattern Matching in Large Attributed Graphs," Proceedings of the 13$^{th}$ ACM SIGKDD International Conference on Knowledge Discovery and Data Mining, ACM, 2007, 10 pages.

U.S. Appl. No. 12/059,258, filed Mar. 31, 2008, Inventors Sourabh Satish et al.

U.S. Appl. No. 12/059,271, filed Mar. 31, 2008, Inventors Brian Hernacki et al.

U.S. Appl. No. 12/242,634, filed Sep. 30, 2008, Inventors Josephine Gibney et al.

U.S. Appl. No. 12/407,772, filed Mar. 19, 2009, Inventors Carey S. Nachenberg et al.

U.S. Appl. No. 12/416,020, filed Mar. 31, 2009, Inventors Shane Pereira et al.

U.S. Appl. No. 12/831,004, filed Jul. 6, 2010, Inventors Carey S. Nachenberg et al.

U.S. Appl. No. 13/677,914, filed Nov. 15, 2012, Inventors Duen Hong Chau et al.

U.S. Appl. No. 13/666,788, filed Nov. 1, 2012, Inventors Carey S. Nachenberg et al.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.

Zhu, X., "Semi-Supervised Learning with Graphs," 2005, 174 pages.

\* cited by examiner

WEB SITE COMPUTER SECURITY USING CLIENT HYGIENE SCORES

CROSS-REFERENCE TO RELATED APPLICATIONS

This application is a continuation of application Ser. No. 11/692,469, filed Mar. 28, 2007, which is a continuation-in-part of application Ser. No. 11/618,215, filed Dec. 29, 2006, all of which are hereby incorporated by reference.

BACKGROUND OF THE INVENTION

1. Field of the Invention

This invention pertains in general to computer security and in particular to assessing risks presented by computer files and/or other entities that can potentially compromise a computer.

2. Description of the Related Art

There is a wide variety of malicious software (malware) that can attack modern computers. Malware threats include computer viruses, worms, Trojan horse programs, spyware, adware, crimeware, and phishing web sites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

While classical malware was usually mass-distributed to many computers, modern malware is often targeted and delivered to only a relative handful of computers. A Trojan horse program can be designed to target computers in a particular department of a particular enterprise. Likewise, a false email can include a phishing attack that is directed to only customers of a certain bank or other electronic commerce site.

Mass-distributed malware can often be detected and disabled by conventional security software. The security software uses techniques such as signature scanning and behavior monitoring heuristics to detect the malware. However, these techniques are less effective for detecting targeted threats since there are fewer instances of the same malware, and the security software might not be configured to recognize it.

Moreover, even mass-distributed malware is becoming harder to detect. A malicious web site might automatically generate new malicious code for every few visitors. As a result, the malware is widely-distributed but only a small number of users have the exact same code, and it becomes impractical to generate signatures (and use signature scanning-based techniques) to detect it. Sometimes, the different versions of the malware perform different functions, which also makes the malware difficult to detect through heuristics and other techniques. Therefore, there is a need in the art for new ways to detect malware.

BRIEF SUMMARY

The above and other needs are met by a method, system, and computer program product that utilize hygiene and reputation scores to provide computer security. Embodiments of the method of providing computer security include determining client hygiene scores associated with a plurality of clients. The client hygiene scores represent assessments of the trustworthiness of the clients. The method further includes determining secondary hygiene scores associated with a plurality of web sites responsive to the hygiene scores associated with the plurality of clients. In addition, the method includes identifying a file hosted by one or more of the plurality of web sites and calculating and storing a reputation score for the file responsive to the secondary hygiene scores of the one or more web sites that host the file. The reputation score represents an assessment of whether the file is malicious.

Embodiments of the system and computer program product include a hygiene cache module for storing client hygiene scores associated with a plurality of clients. The client hygiene scores represent assessments of the trustworthiness of the clients. The system and computer program product further include a hygiene computation module for calculating secondary hygiene scores associated with a plurality of web sites responsive to the client hygiene scores associated with the plurality of clients and a reputation computation module for calculating and storing a reputation score for a file responsive to secondary hygiene scores of one or more of the plurality of web sites that host the file. The reputation score represents an assessment of whether the file is malicious.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
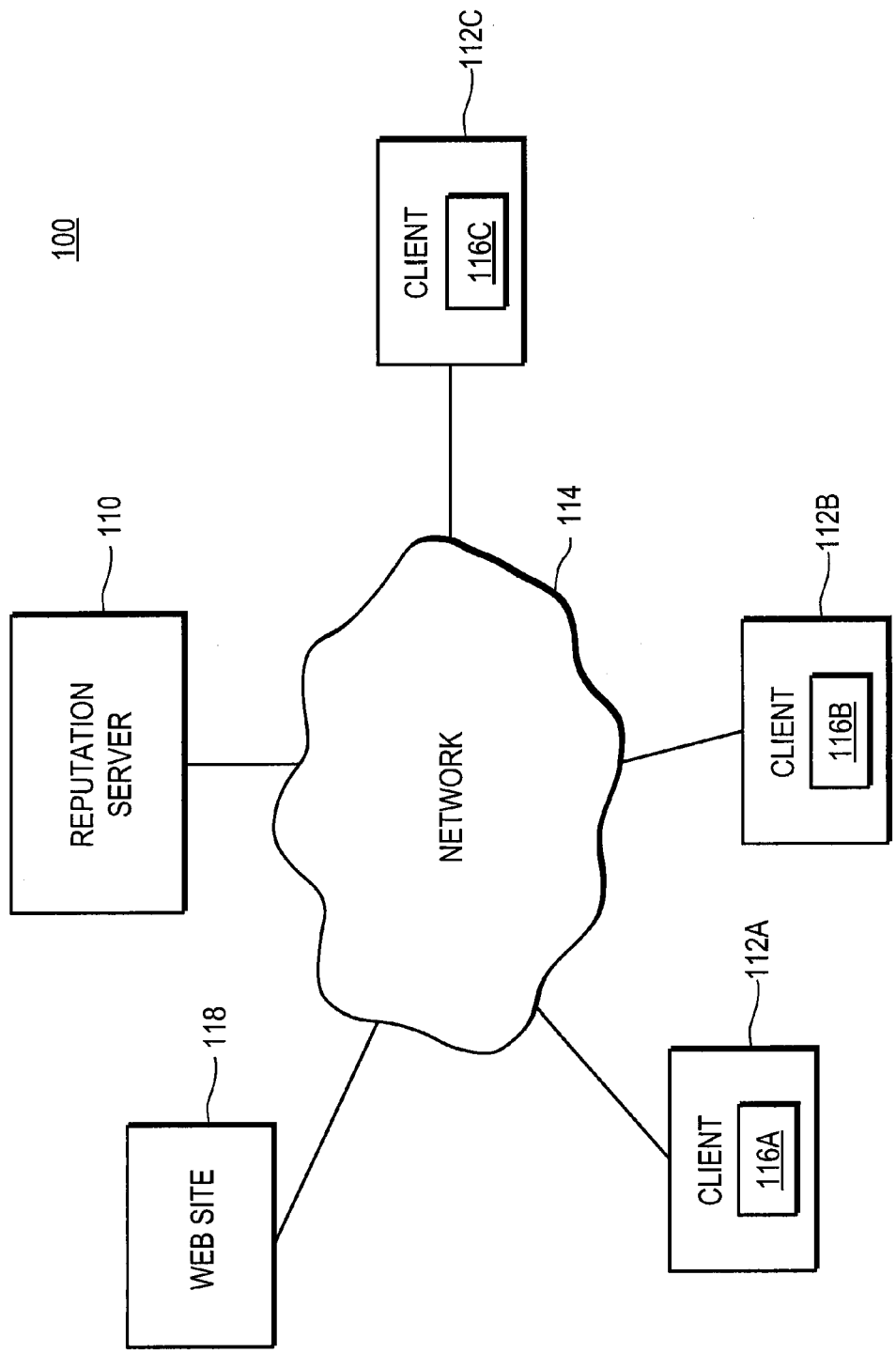
FIG. 1 is a high-level block diagram of a computing environment according to one embodiment.

FIG. 1 is a high-level block diagram of a computing environment 100 according to one embodiment. FIG. 1 illustrates a reputation server 110 and three clients 112 connected by a network 114. A web site 118 is also connected to the network 114. Only three clients 112 and one web site 118 are shown in FIG. 1 in order to simplify and clarify the description. Embodiments of the computing environment 100 can have thousands or millions of clients 112 and/or web sites 118 connected to the network 114.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The reputation server 110 interacts with the clients 112 via the network 114. In one embodiment, the reputation server 110 receives hygiene scores from the clients 112. A client's hygiene score represents an assessment of the trustworthiness of the client 112. "Trustworthiness" in this context refers to the client's propensity for getting infected by malware and other computer-related threats, where a client 112 that is infected more often is less trustworthy. "Trustworthiness"

also corresponds to the ability of the user to avoid the threats. In some embodiments, the reputation server 110 computes the hygiene scores itself based on the data received from the clients 112. Further, the reputation server 110 receives data describing web sites 118 visited by the clients 112, and data describing files encountered at the sites (e.g., downloaded from the sites) by the clients.

In one embodiment, the reputation server 110 computes secondary hygiene scores for the web sites 118 visited by the clients. The secondary hygiene scores are based on the hygiene scores of the clients 112 that visit the site. For example, a web site 118 that is predominately visited by clients 112 having good hygiene scores is likely to receive a good secondary hygiene score because the site is frequented by users that are good at avoiding computer threats. Conversely, a web site 118 that is predominately visited by clients 112 having poor hygiene scores is likely to receive a poor secondary hygiene score.

The reputation server 110 utilizes the secondary hygiene scores, in turn, to calculate reputation scores for files and/or other entities hosted by the web sites 118. A reputation score is an assessment of the likelihood that the file (or other entity) is malicious (e.g., is a computer-related threat). For example, if a particular file is predominantly found on sites 118 with poor secondary hygiene scores, there is an elevated risk that the file is malicious. Therefore, the file is likely to receive a poor reputation score. In contrast, a file predominately found on sites 118 with good secondary hygiene scores is likely to receive a good reputation score.

The reputation server 110 provides the reputation scores for the files to the clients 112, and the clients (and users of the clients) use the scores to guide behaviors with respect to whether to perform certain activities. For example, a client 112 can be configured to quarantine downloaded files that have reputation scores below a threshold. Likewise, a user can decline to install or execute a file upon viewing that file's low reputation score.

In one embodiment, a client 112 is a computer used by one or more users to perform activities including downloading, installing, and/or executing files and browsing web sites 118 on the network 114. The client 112, for example, can be a personal computer executing a web browser such as MICROSOFT INTERNET EXPLORER that allows the user to retrieve and display content from web servers 118 and other computers on the network 114. In other embodiments, the client 112 is a network-capable device other than a computer, such as a personal digital assistant (PDA), a mobile telephone, a pager, a television "set-top box," etc. For purposes of this description, the term "client" also includes computers such as servers and gateways that encounter files or other entities that might constitute malware or other threats.

In one embodiment, the client 112 executes a security module 116 that monitors the state of the client. The state includes activities performed on the client, such as web sites visited and files downloaded from those sites. The state monitored by the security module 116 can also include other aspects, such as files installed and/or executed at the client. In addition, an embodiment of the security module 116 monitors malware detections on the client 112.

Further, an embodiment of the security module 116 computes the client's hygiene score based on its state and provides this score to the reputation server 110. Oftentimes, there is a vast disparity in hygiene scores. Certain types of users, such as teenagers, are substantially more likely to engage in risky online behaviors than other users. For example, teenagers and other young people are more likely to download files from peer-to-peer networks and other places where malware is often found. These activities lead to increased detections of malware and, as a result, clients used by such users often receive poor hygiene scores. Other users do not engage in risky behaviors and encounter malware infrequently. Clients 112 of these latter users receive good hygiene scores.

The security module 116 provides data describing the state of the client 112 to the reputation server 110. In one embodiment, the security module 116 monitors the web sites visited by the client 112. Each time the client 112 visits a web site, the security module 116 provides the URL of the site and the client's hygiene score to the reputation server 110. Further, an embodiment of the security module 116 detects when the client 112 encounters a file on a web site 118. When the client 112 encounters (e.g., downloads) a file from a site 118, the security module 116 provides an identifier of the file (e.g., a hash of the file) and an identifier of the site 118 (e.g., the URL and/or domain of the web site) where the file was hosted to the reputation server 110.

In addition, the security module 116 receives reputation scores for encountered files from the reputation server 110. In one embodiment, the security module 116 receives the reputation score for a file in response to the message it sends that identifies the file and web site 118 that hosted it. In one embodiment, the security module 116 evaluates the reputation score for a file by, for example, comparing it to a threshold or displaying a message based on it to the user. The security module 116 optionally quarantines or performs another operation involving the file in response to a result of the evaluation.

Using hygiene and reputation scores in this manner correlates the users' abilities to avoid threats with the web sites 118 visited by the users in order to evaluate the hygiene of the web sites. The web sites' hygienes are then reflected on files hosted by the sites in the form of reputation scores for the files. This approach thus leverages the collective intelligence of the users to assign reputation scores to files that measures the risks associated with the files. The reputation scores are computed without requiring the users to explicitly evaluate or judge the file or web site 118. Further, the reputation scores are computed without requiring a sophisticated analysis of the files. Thus, the approach is well-suited to a computing environment where there are significant amounts of malware or other threats that might not be identified using conventional signature scanning and/or heuristic techniques.

The network 114 represents the communication pathways between the reputation server 110 and clients 112. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
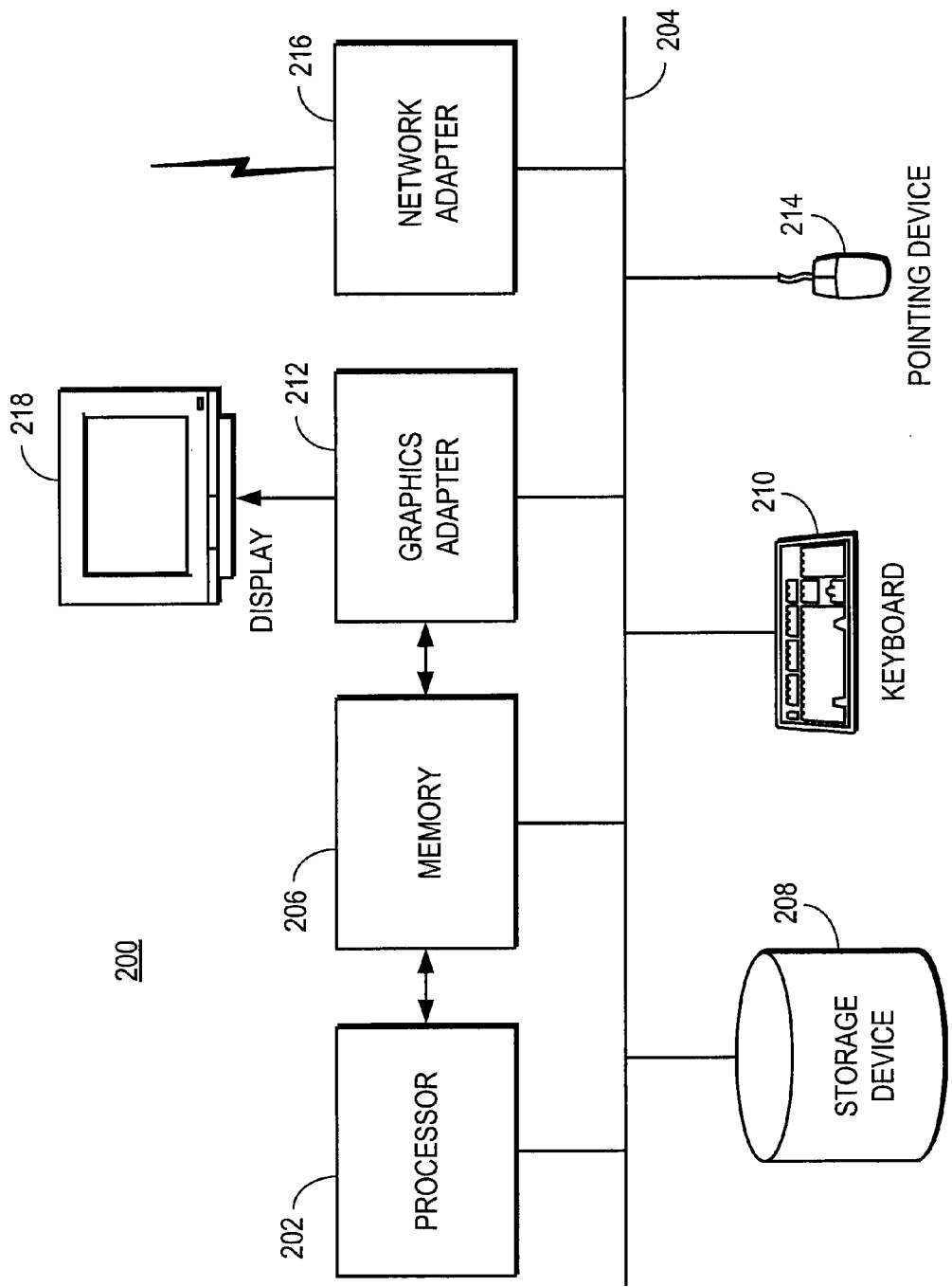
FIG. 2 is a high-level block diagram illustrating a typical computer for use as a reputation server or client.

FIG. 2 is a high-level block diagram illustrating a typical computer 200 for use as a reputation server 110 or client 112. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, a client 112 that is a mobile telephone typically has limited processing power, a small display 218, and might lack a pointing device 214. The reputation server 110, in contrast, may comprise multiple blade servers working together to provide the functionality described herein.

Figure 3:
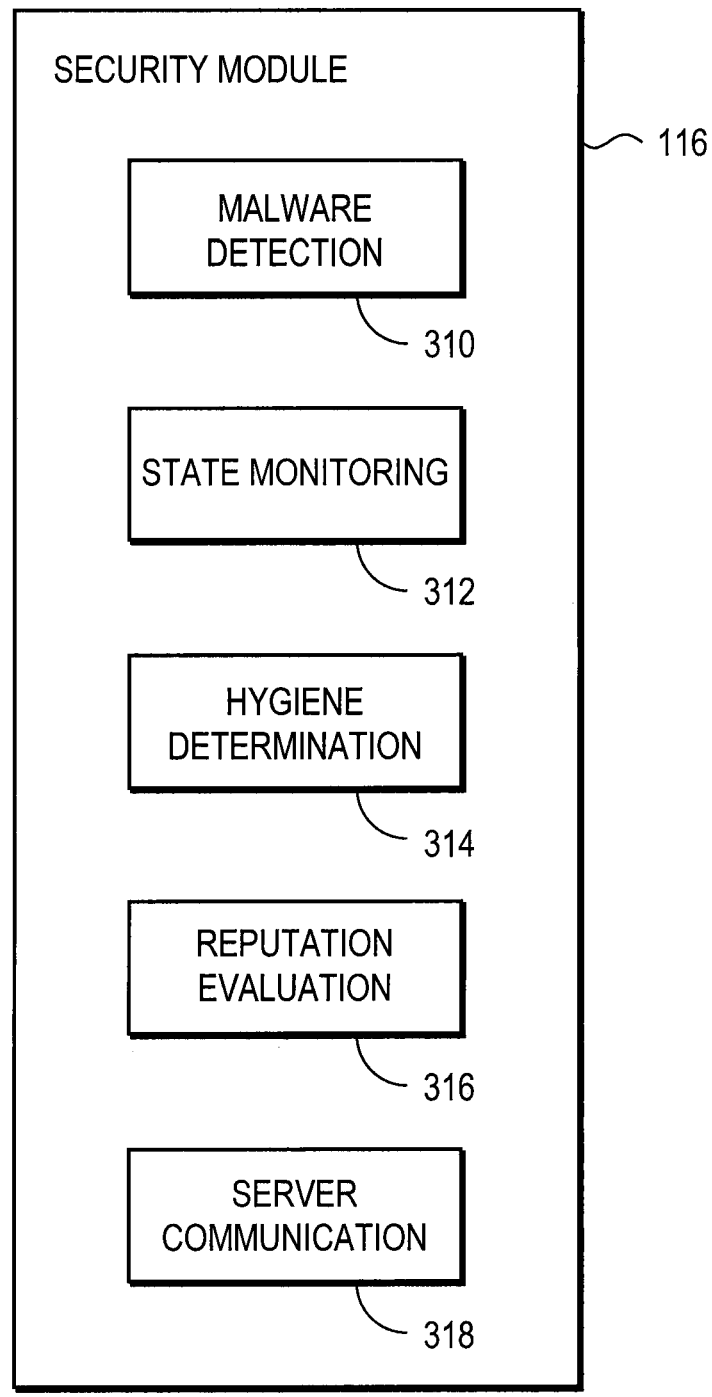
FIG. 3 is a high-level block diagram illustrating a detailed view of the security module of a client according to one embodiment.

FIG. 3 is a high-level block diagram illustrating a detailed view of the security module 116 of a client 112 according to one embodiment. In some embodiments the security module 116 is incorporated into an operating system executing on the client 112 while in other embodiments the security module is a standalone application or part of another product. As shown in FIG. 3, the security module 116 itself includes multiple modules. Those of skill in the art will recognize that other embodiments of the security module 116 can have different and/or other modules than the ones described here, and that the functionalities can be distributed among the modules in a different manner.

A malware detection module 310 detects the presence of malware on the client 112. As mentioned above, "malware" includes software such as computer viruses, worms, Trojan horse programs, and the like. For purposes of this description, "malware" also includes malicious web sites such as "phishing" sites that attempt to trick users into revealing confidential information. In one embodiment, the malware detection module 310 includes a signature database that describes known types of malware. The malware detection module 310 uses techniques such as emulation and signature scanning to match signatures in the database with files and/or other data on the client 112. If a match occurs, the matching data are assumed to be malware. In addition, embodiments of the malware detection module 310 use heuristics and other techniques to detect previously-unknown malware. In some embodiments, the malware detection module 310 includes additional functionality for performing tasks such as preventing the malware from damaging the client 112 and removing the malware.

A state monitoring module 312 monitors the state of the client 112 to detect encounters between the client 112 and entities such as web sites and files. More specifically, an embodiment of the state monitoring module 312 monitors activities involving web browsing and/or other activities conducted via the network 114. One embodiment of the state monitoring module 312 monitors network communications in order to determine the web sites 118 browsed by the client 112. Another embodiment of the state monitoring module 312 examines a file cache maintained by a client-side web browser in order to determine the sites 118 that were visited using the browser.

An embodiment of the state monitoring module 312 detects files that are encountered by the client 112, such as files that are introduced to, or executed on, the client. For example, the state monitoring module 312 identifies files that are downloaded from web sites and/or other locations on the network 114. In one embodiment, the state monitoring module 312 identifies a file by generating a hash that uniquely identifies it. Further, some embodiments of the state monitoring module 312 monitor, and identify, only executable files and/or other file types in which malware might reside.

A hygiene computation module 314 calculates a hygiene score for the client 112 in response to a set of metrics. In one embodiment, the metrics include malware detections by the malware detection module 310. In one embodiment, the hygiene computation module 314 sends the data constituting the metrics to the reputation server 110, and the server calculates the hygiene score for the client 112.

In one embodiment, the hygiene computation module 314 uses metrics based on the frequency of occurrence of certain events, such as malware detections. For example, the metrics can include the number of malware detections observed during a time period such as a week, month, or three-month interval. Likewise, the metrics can include the number of malware detections measured relative to a number of files downloaded and/or installed on the client 112. The hygiene score for a client 112 can change over time if the frequency of events measured by the metrics also changes.

In one embodiment, the hygiene score is a numeric value normalized within a given range, such as zero and one, in order to allow direct comparisons between hygiene scores of multiple clients. For example, a score of zero can represent the poorest hygiene while a score of one can represent the best hygiene. In other embodiments, the hygiene score is quantized into one of a limited set of values, e.g., the only possible hygiene scores are zero and one.

A reputation evaluation module 316 receives reputation scores for files and/or other entities from the reputation server 110. In one embodiment, the reputation evaluation module 316 works with the state monitoring module 312 to detect when the client 112 encounters a file having a reputation score. These encounters can include activities performed automatically without the user's knowledge and activities that occur at the user's direction. For example, the module 316 detects when the client web browser downloads a file from a web server, when there is an attempt to install a file on the client 112, and when the user attempts to execute a file. In one embodiment, the reputation evaluation module 316 sends the identity of the file (e.g., a hash of the file) to the reputation server 110 and receives a reputation score in return. In some embodiments, the reputation evaluation module 316 maintains a cache of reputation scores for certain programs, and consults the cache before (or instead of) contacting the reputation server 110 to determine whether the score is contained therein. Further, an embodiment of the reputation evaluation module 316 maintains an exclusion set that identifies files or other entities the reputation evaluation module need not evaluate. These excluded entities are identified using digitally-signed hashes of the files and/or via other techniques.

In one embodiment, the state monitoring module 312 quarantines a file and/or suspends an activity involving the file while the reputation evaluation module 316 obtains the file's reputation score. The reputation evaluation module 316 evaluates the reputation score and, depending upon the score, maintains the quarantine, deletes the file, cancels the suspended activity or performs another action. In one embodiment, the reputation evaluation module 316 evaluates the reputation score against a reputation threshold and performs a specified action if the score is below the threshold (and performs a different action if the score is above the threshold). For example, the reputation module 316 can determine that a file that the browser has downloaded from a web site 118 has a reputation score below the threshold, and therefore maintain the quarantine and notify the user that the file is likely malicious. In one embodiment, the threshold is set by the user. In other embodiments, the threshold is set by an administrator of the client 112 or by the reputation server 110.

In one embodiment, the reputation evaluation module 316 displays a message describing the reputation score to the user, and thereby provides the user with an opportunity to maintain the quarantine, delete the file, cancel an activity, or perform another action in response to the score. This display can occur if the reputation score is below the reputation threshold (or below a different threshold). For example, the reputation evaluation module 316 can detect that a file the user is attempting to execute has a low reputation score, and display the reputation score or a warning message to the user to let the user evaluate the potential threat.

In some embodiments, the reputation score displayed to the user is represented as a numeric value while in other embodiments it is represented using other techniques such as a textual description or graphical icon. For example, an embodiment of reputation evaluation module 316 displays a reputation score for a file in a dialog box or other user interface (UI) element when the user attempts to execute the file. Similarly, an embodiment of the reputation evaluation module 316 provides a graphical icon describing the reputation score of a web site when the user attempts to browse the site. The display presented by the reputation evaluation module 316 can include, for example, a dialog box with a message like "This program has a bad reputation. Are you sure you want to install it?"

In one embodiment, the display presented by the reputation evaluation module 316 provides the user with the opportunity to cancel the activity. Thus, the dialog box presented by the module 316 can include a set of "Yes/No" or "OK/Cancel" buttons that let the user cancel or confirm the installation or execution of a file. The reputation evaluation module 316 remembers the user's response to the displayed reputation score and does not necessarily display the reputation score each time the user performs an action.

A server communication module 318 communicates with the reputation server 110 via the network 114. In one embodiment, the server communication module 318 sends reports providing information about the client 112 to the server 110. The information includes the client's hygiene score and descriptions of monitored encounters between the client 112 and entities such as web sites and files. In addition, an embodiment of the server communication module 318 receives information from the reputation server 110 that is used to provide security on the client 112. The received information includes reputation scores for files and other entities, malware definitions, and other updates to the security module 116.

In one embodiment, the server communication module 318 sends a tuple to the reputation server 110 each time the client 112 visits a web site and/or downloads a file from a site. When reporting a web site visit, the tuple contains the client's hygiene score and the URL or other identifier of the visited web site. When reporting a file download, the tuple contains the URL or other identifier of the site from which the file was downloaded and the identifier of the file. The tuple can contain different and/or additional information in some embodiments. For example, the tuple can contain just the domain name of the web site rather than an entire URL. In one embodiment, the server communication module 318 receives the reputation score for a file from the reputation server 110 in response to sending the tuple that identifies the file.

Figure 4:
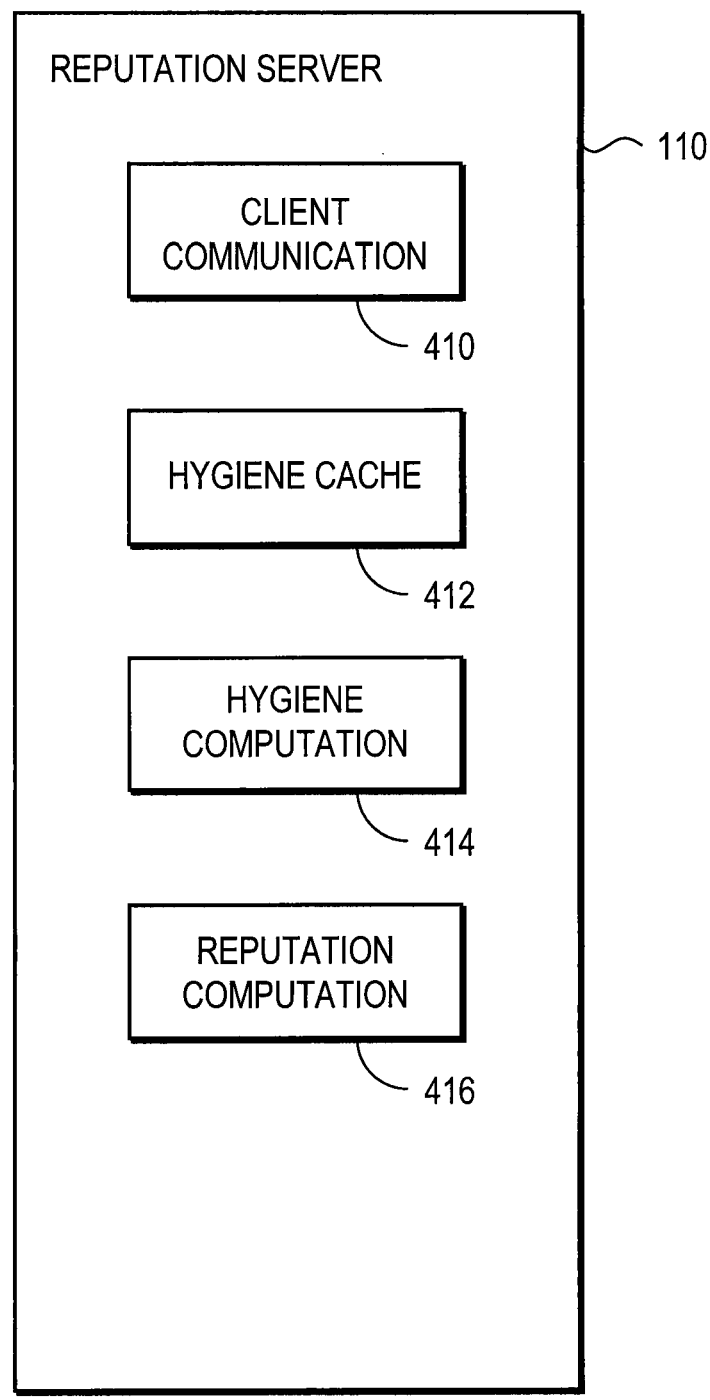
FIG. 4 is a high-level block diagram illustrating a detailed view of the reputation server according to one embodiment.

FIG. 4 is a high-level block diagram illustrating a detailed view of the reputation server 110 according to one embodiment. In one embodiment, the reputation server 110 is operated by the same entity that provides the security modules 116 to the clients 112. As shown in FIG. 4, the reputation server 110 includes several modules. Those of skill in the art will recognize that other embodiments of the reputation server 110 can have different and/or other modules than the ones described here, and that the functionalities can be distributed among the modules in a different manner. In addition, the functions ascribed to the reputation server 110 can be performed by multiple servers.

A client communication module 410 communicates with the clients 112 via the network 114. In one embodiment, the client communication module 410 receives data describing hygiene scores, visited web sites, files encountered by the clients, and/or other aspects of the clients 112. Further, an embodiment of the client communication module 410 provides reputation scores for files and/or other information to the clients 112.

A hygiene cache module 412 stores hygiene scores received from the clients 112. In an embodiment where hygiene scores are received in (hygiene score, URL) tuples, the hygiene cache module 412 stores the scores in a table or other data structure that associates the client hygiene scores with the web sites visited by the clients 112. Thus, the data in the hygiene cache module 412 collectively describe the hygiene scores of clients 112 and the web sites 118 the clients have visited.

In one embodiment, a hygiene computation module 414 calculates and stores secondary hygiene scores for web sites 118 based, at least in part, on the hygiene scores of the clients 112 that visited the sites. The secondary hygiene score of a site 118 associates the hygiene scores of users that visit the site with the site itself. Assume, for example, that 1000 users with poor hygiene scores and 2000 users with good hygiene scores visit web site A. Also assume that 2000 users with poor hygiene scores and 10 users with good hygiene scores visit web site B. The predominant association of poor-hygiene users with web site B contributes to a worse hygiene score for web site B than for web site A. As with client hygiene scores, the secondary hygiene score can be a numeric value normalized within a given range, such as zero and one, or another representation. In one embodiment, the secondary hygiene score is calculated per domain, rather than per site. Thus, all web sites hosted at a particular domain have the same secondary hygiene score.

The hygiene computation module 614 initially assigns a new and/or previously-unknown web site 118 a probationary hygiene score. In one embodiment, the probationary score indicates that the site 118 has poor hygiene. Once the site 118 is visited by a minimum number of clients 112, the hygiene computation module 614 calculates a true secondary hygiene score for the site 118 based on the hygiene of the clients that visited it. Thus, the initial hygiene score for a site 118 is likely to change as it is encountered by an increasing number of clients 112. The hygiene score for a site 118 can continue to change over time as the hygiene scores of clients 112 that visit it change.

A reputation computation module 416 computes and stores reputation scores for files hosted by web sites and/or for other entities. In one embodiment, the reputation score of a file is based primarily on the secondary hygiene scores of the web sites 118 that host the file. For example, a file that is predominately hosted by poor-hygiene web sites will have a poor reputation score because there is a significant chance that it is malicious. On the other hand, a file that is hosted on web sites with both good and poor secondary hygiene scores (or just good hygiene scores) will have a good reputation score because it is likely to be legitimate.

In one embodiment, the reputation computation module 416 utilizes data received from the clients 112 to determine which web sites host which files. As described above, the clients 112 identify the web sites 118 at which the clients encounter files and provide these data to the reputation server 110. The reputation computation module 416 uses the data to determine the set of sites that host particular files. In another embodiment, the reputation computation module 416 utilizes data gathered directly from the web sites 118. For example, the entity operating the reputation server 110 can crawl web sites 118 on the network 114 and gather data describing which files are hosted on which sites. In other embodiments, the data are obtained from third parties. Further, some embodiments use combinations of one or more of the techniques described above.

In one embodiment, the reputation score is a numeric value similar to the hygiene score. The reputation score is normalized within a given range, such as zero and one, in order to allow direct comparisons across reputation scores of different files. For example, a score of zero can represent the poorest reputation while a score of one can represent the best reputation. In other embodiments, the reputation score is quantized into one of a limited set of values. As with hygiene scores, the reputation score assigned to a file can evolve over time as the hygiene scores of sites that host the file change. One embodiment initially assigns a previously-unknown file a low reputation score during a probationary period.

Figure 5:
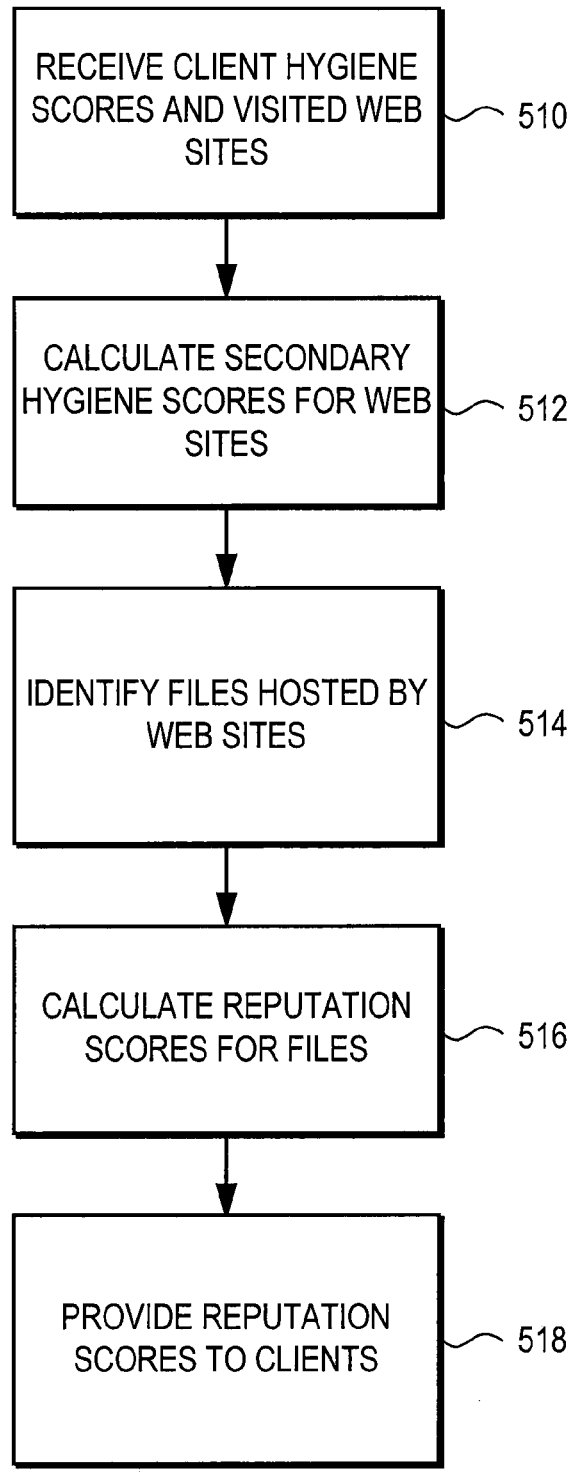
FIG. 5 is a flowchart illustrating steps performed by the reputation server to provide reputation scores for files to clients according to one embodiment.

FIG. 5 is a flowchart illustrating steps performed by the reputation server 110 to provide reputation scores for files to clients 112 according to one embodiment. Other embodiments perform the illustrated steps in different orders, and/or perform different or additional steps. Moreover, some or all of the steps can be performed by modules other than the reputation server 110. Those of skill in the art will recognize that embodiments of the reputation server 110 simultaneously communicate with multiple clients 112 and compute reputation scores for multiple entities. Therefore, embodiments of the reputation server 110 may perform multiple instances of the steps of FIG. 5 simultaneously.

The reputation server 110 receives 510 hygiene scores from the clients 112. As described above, the hygiene scores represent assessments of the trustworthiness of the clients 112. The reputation server 110 also receives 510 data describing web sites 118 visited by the clients 112. In one embodiment, these data are received together in a tuple containing the client hygiene score and the URL of a visited web site.

The reputation server 110 calculates 512 secondary hygiene scores of the web sites 118 visited by the clients 112. In one embodiment, the secondary hygiene scores of the sites are determined based on the hygiene scores of the clients 112 that visit those sites. Thus, a site 118 that is predominately visited by clients 112 having good hygiene scores is likely to receive a good secondary hygiene score while a site 118 that is predominately visited by clients 112 having poor hygiene scores is likely to receive a poor secondary hygiene score.

The reputation server 110 identifies files hosted by the various web sites 118. In one embodiment, the reputation server 110 receives data from the clients 112 identifying files that the clients encountered at (e.g., downloaded from) the sites 118. In one embodiment, these data are received together in a tuple containing an identifier of the web site 118 and an identifier of a file encountered at the site. In some embodiments, the reputation server 110 uses different and/or additional techniques to identify files hosted by the web sites 118.

The reputation server 110 calculates 516 reputation scores for the identified files. The reputation scores are based on the secondary hygiene scores of the sites 116 that host the files. The server 110 may compute a good reputation score for a file that is hosted by many web sites 118 having good hygiene scores. In the same vein, the server 110 may compute a poor reputation score for a file predominately hosted by sites 116 having poor hygiene scores.

The reputation server 110 provides 518 the reputation score for files to the clients 112. For example, the reputation server 110 may send the reputation score to a client 112 in response to receiving the tuple identifying the file and site on which the file was encountered. The clients 112 and/or users of the clients evaluate the scores to determine whether the files are legitimate (e.g., safe to execute). A client 112 might quarantine, delete, or block execution of a file having a poor reputation score.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing computer security, comprising:
receiving, by one or more computer processors, from a plurality of clients, data describing client hygiene scores for the clients and describing a plurality of web sites visited by the clients, the client hygiene score for a client calculated responsive to an amount of malicious software detected at the client based on a scan of the client;
determining, by one or more computer processors, a secondary hygiene score for a web site of the plurality of web sites visited by the clients based at least in part on client hygiene scores of clients that visited the web site;
identifying, by one or more computer processors, a file hosted by the web site; and
calculating and storing, by one or more computer processors, a reputation score for the file responsive to the secondary hygiene score of the web site that hosts the file.

2. The computer-implemented method of claim 1, wherein the reputation score represents an assessment of whether the file is malicious.

3. The computer-implemented method of claim 1, wherein determining the secondary hygiene score for the web site comprises:
   determining, by one or more computer processors, whether the web site was predominantly visited by clients with good client hygiene scores; and
   responsive to determining that the web site was predominantly visited by clients with good client hygiene scores, assigning, by one or more computer processors, a secondary hygiene score indicating good hygiene to the web site.

4. The computer-implemented method of claim 1, further comprising:
   receiving, by one or more computer processors, data describing a domain hosting a plurality of web sites visited by the clients; and
   determining, by one or more computer processors, a secondary hygiene score for the domain hosting the plurality of web sites based on client hygiene scores of clients that visited the plurality of web sites hosted by the domain, the plurality of web sites hosted by the domain sharing the same secondary hygiene score as the domain.

5. The computer-implemented method of claim 1, further comprising:
   assigning, by one or more computer processors, a probationary hygiene score to a second web site of the plurality of web sites visited by the clients, the probationary hygiene score of the second web site indicating that the second web site has a poor hygiene; and
   responsive to a number of clients that visited the second web site exceeding a threshold, calculating, by one or more computer processors, a true hygiene score of the second web site based at least in part on the hygiene scores of the clients that visited the second web site.

6. The computer-implemented method of claim 1, wherein identifying the file hosted by the web site comprises:
   receiving, from a client by one or more computer processors, data identifying the web site and the file hosted by the web site.

7. The computer-implemented method of claim 1, wherein the file is hosted by a plurality of web sites and wherein calculating a reputation score for the file responsive to the secondary hygiene score of the web site that hosts the file comprises:
   determining, by one or more computer processors, whether the plurality of web sites that host the file have predominantly good or bad secondary hygiene; and
   determining, by one or more computer processors, the reputation score for the file responsive to the predominant secondary hygiene scores of the plurality of web sites that host the file, wherein the file receives a reputation score indicating that the file is potentially malicious responsive to the file being hosted by web sites having predominantly bad secondary hygiene.

8. The computer-implemented method of claim 1, further comprising:
   providing, by one or more computer processors, the reputation score for the file to a client that encounters the file.

9. The computer-implemented method of claim 1, wherein the reputation score of the file reflects the secondary hygiene scores of a plurality of web sites that host the file.

10. The computer-implemented method of claim 1, further comprising:
    calculating, by one or more computer processors, the client hygiene score for the client based at least in part on a number of malware detections at the client relative to a number of files downloaded to the client.

11. The computer-implemented method of claim 1, further comprising:
    normalizing, by one or more computer processors, the client hygiene score for the client to within a range of numeric values.

12. A system for providing computer security, comprising:
    a non-transitory computer-readable storage medium storing executable computer program modules comprising:
        a hygiene cache module for receiving from a plurality of clients data describing client hygiene scores for the clients and describing a plurality of web sites visited by the clients, and for storing the client hygiene scores associated with the plurality of clients, the client hygiene score for a client calculated responsive to an amount of malicious software detected at the client based on a scan of the client;
        a hygiene computation module for calculating a secondary hygiene score for a web site of the plurality of web sites visited by the clients based at least in part on client hygiene scores of clients that visited the web site; and
        a reputation computation module for calculating and storing a reputation score for a file hosted by the web site responsive to the secondary hygiene score of the web site; and
    a processor and a memory for executing the computer program modules.

13. The system of claim 12, wherein the reputation score represents an assessment of whether the file is malicious.

14. The system of claim 12, wherein the hygiene computation module is further for:
    determining whether the web site was predominantly visited by clients with good client hygiene scores; and
    responsive to determining that the web site was predominantly visited by clients with good client hygiene scores, assigning a secondary hygiene score indicating good hygiene to the web site.

15. The system of claim 12, the hygiene cache module is further for:
    receiving data describing a domain hosting a plurality of web sites visited by the clients; and
    the hygiene computation module is further for determining a secondary hygiene score for the domain hosting the plurality of web sites based on client hygiene scores of clients that visited the plurality of web sites hosted by the domain, the plurality of web sites hosted by the domain sharing the same secondary hygiene score as the domain.

16. The system of claim 12, further comprising:
    a client communication module for receiving from the client data identifying the web site and the file hosted by the web site.

17. The system of claim 12, further comprising:
    a client communication module for providing the reputation score for the file to a client that encounters the file.

18. A non-transitory computer-readable storage medium with executable computer program instructions embodied therein for providing security, the computer program instructions comprising:
    a hygiene cache module for receiving from a plurality of clients data describing client hygiene scores for the clients and describing a plurality of web sites visited by the clients, and for storing the client hygiene scores associated with the plurality of clients, the client hygiene score for a client calculated responsive to an amount of malicious software detected at the client based on a scan of the client;

a hygiene computation module for calculating a secondary hygiene score for a web site of the plurality of web sites visited by the clients based at least in part on client hygiene scores of clients that visited the web site; and a reputation computation module for calculating and storing a reputation score for a file hosted by the web site responsive to the secondary hygiene score of the web site.

19. The non-transitory computer-readable storage medium of claim 18, wherein the reputation score represents an assessment of whether the file is malicious.

20. The non-transitory computer-readable storage medium of claim 18, further comprising:

a client communication module for receiving from a client data identifying the web site and a file hosted by the web site.

* * * * *